(12) United States Patent
Zhang et al.

(10) Patent No.: US 11,557,053 B2
(45) Date of Patent: Jan. 17, 2023

(54) DEEP LEARNING TO CORRECT MAP AND IMAGE FEATURES

(71) Applicant: International Business Machines Corporation, Armonk, NY (US)

(72) Inventors: Rui Zhang, Chappaqua, NY (US); Conrad M. Albrecht, White Plains, NY (US); Siyuan Lu, Yorktown Heights, NY (US); Wei Zhang, Elmsford, NY (US); Ulrich Alfons Finkler, Mahopac, NY (US); David S. Kung, Chappaqua, NY (US); Xiaodong Cui, Chappaqua, NY (US); Marcus Freitag, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 251 days.

(21) Appl. No.: 16/785,469

(22) Filed: Feb. 7, 2020

(65) Prior Publication Data
US 2021/0248765 A1    Aug. 12, 2021

(51) Int. Cl.
*G06T 7/55* (2017.01)
*G06T 7/33* (2017.01)
*G06N 3/08* (2006.01)
*G06N 20/20* (2019.01)
*G06N 3/04* (2006.01)

(52) U.S. Cl.
CPC .............. *G06T 7/55* (2017.01); *G06N 3/0454* (2013.01); *G06N 3/08* (2013.01); *G06N 20/20* (2019.01); *G06T 7/337* (2017.01); *G06T 2207/20081* (2013.01); *G06T 2207/20084* (2013.01); *G06T 2207/20224* (2013.01)

(58) Field of Classification Search
CPC ................... G06T 7/0012; G06T 7/143; G06T 2207/20081; G06T 2207/10081; G06T 7/12; G06T 2207/10088; G06T 2207/30064; G06T 7/33; G06T 2207/20121; G06T 7/11; G06T 7/149; G06T 2207/10096; G06T 2207/20076; G06T 2207/30084; G06T 2207/10101; G06T 2207/20084; G06T 2207/20124; G06T 2207/30016; G06T 2207/30041; G06T 7/0016
USPC ......................................................... 382/276
See application file for complete search history.

(56) References Cited

U.S. PATENT DOCUMENTS

| 9,816,826 | B2 | 11/2017 | Renz |
| 10,217,232 | B2 | 2/2019 | Harada |
| 10,489,663 | B2 | 11/2019 | Olson et al. |
| 2017/0116783 | A1* | 4/2017 | Huang ...................... G06T 7/73 |

(Continued)

OTHER PUBLICATIONS

Maggiori et al., "Recurrent Neural Networks to Correct Satellite Image Classification Maps," IEEE Transactions on Geoscience and Remote Sensing, vol. 55, Issue 9, Sep. 2017 [Abstract Only].

(Continued)

*Primary Examiner* — Ajibola A Akinyemi
(74) *Attorney, Agent, or Firm* — Patterson + Sheridan, LLP (57) ABSTRACT

Techniques for image processing and transformation are provided. A plurality of images and a plurality of maps are received, and a system of neural networks is trained based on the plurality of images and the plurality of maps. A first image is received, and a first map is generated by processing the first image using the system of neural networks.

20 Claims, 7 Drawing Sheets

(56) References Cited

U.S. PATENT DOCUMENTS

2019/0266448 A1* 8/2019 Thiruvenkadam ... G06K 9/6271
2020/0201513 A1* 6/2020 Malmed ................. G06F 3/012
2020/0311985 A1* 10/2020 Jeong ....................... G06N 3/02

OTHER PUBLICATIONS

Vargas-Munoz, "Correcting Rural Building Annotations In OpenStreetMap Using Convolutional Neural Networks," arXiv:1901.08190v1 [cs.CV] Jan. 24, 2019, 33 pages.
Authors et. al.: Disclosed Anonymously, "Stylizing Map Based on Examples of Representative Styling," IP.com No. IPCOM000252003D, IP.com Electronic Publication Date: Dec. 13, 2017, 38 pages.
Authors et. al.: Disclosed Anonymously, "Optimizing Route Guidance to Preserve User Loyalty," IP.com No. PCOM000252346D, IP.com Electronic Publication Date: Jan. 5, 2018, 34 pages.
Authors et. al.: Disclosed Anonymously, "Incentivized Map Learning and Data Updater," IP.com No. PCOM000259070D, IP.com Electronic Publication Date: Jul. 10, 2019, 6 pages.
Jun-Yan Zhu*, Taesung Park*, Phillip Isola, and Alexei A. Efros. "Unpaired Image-to-Image Translation using Cycle-Consistent Adversarial Networks", in IEEE International Conference on Computer Vision (ICCV), 2017.
Bruno Levy and Erica Schwindt, "Notions of optimal transport theory and how to implement them on a computer," arXiv:1710.02634v1 [math.AP] Oct. 7, 2017, 32 pages.
Gabreil Peyre and Marco Cuturi, "Computational Optimal Transport," Foundations and Trends in Machine Learning, vol. 11, No. 5-6, pp. 355-607, 2019.

* cited by examiner

DEEP LEARNING TO CORRECT MAP AND IMAGE FEATURES

BACKGROUND

The present disclosure relates to deep learning, and more specifically, to utilizing deep learning to generate and correct maps and images.

Aerial and satellite imagery have been used to capture images of Earth from platforms that are airborne or located in space. For example, planes, helicopters, blimps, and balloons have been used to capture aerial images, while satellites in orbit can be used to capture satellite images. Increasingly, these images are used to aid navigation, such as by supplementing maps. However, maps often have inaccuracies that are not reflected in the imagery, and images can often have distortions that are not reflected in the maps.

SUMMARY

According to one embodiment of the present disclosure, a method is provided. The method includes receiving a plurality of images and a plurality of maps, and training a system of neural networks based on the plurality of images and the plurality of maps. The method further includes receiving a first image, and generating a first map by processing the first image using the system of neural networks.

According to a second embodiment of the present disclosure, a computer program product is provided. The compute program product comprises one or more computer-readable storage media collectively containing computer-readable program code that, when executed by operation of one or more computer processors, performs an operation. The operation includes receiving a plurality of images and a plurality of maps, and training a system of neural networks based on the plurality of images and the plurality of maps. The operation further includes receiving a first image, and generating a first map by processing the first image using the system of neural networks.

According to a third embodiment of the present disclosure, a system is provided. The system includes one or more computer processors, and one or more memories collectively containing one or more programs which, when executed by the one or more computer processors, performs an operation. The operation includes receiving a plurality of images and a plurality of maps, and training a system of neural networks based on the plurality of images and the plurality of maps. The operation further includes receiving a first image, and generating a first map by processing the first image using the system of neural networks.

DETAILED DESCRIPTION

Embodiments of the present disclosure provide techniques to process images and/or maps using deep learning models in order to remedy distortions, generate improved maps and/or images with better accuracy, and register images to maps. Increasingly, satellite and aerial images have been made available for a variety of purposes. Notably, these images have recently been used to augment mapping systems. Additionally, mapping systems have been expanding in recent years, with some entities seeking to provide publicly available maps and/or images of vast areas, including rural and remote locations as well as urban centers. In some aspects, communities of users can act together to create "open source" maps, where users can collectively map out roads, buildings, highways, and the like.

Many maps today have some inaccuracies or distortions. For example, roads are often mapped in a locations and/or orientations that are not precisely aligned with their actual location. This can cause obvious errors when map data is overlaid on image data. For example, if a map of roads in an area is superimposed on satellite imagery of the area, there are often inaccuracies and distortions where the roads, as indicated by the map, do not line up with the actual location of the roads, as indicated by the satellite. Similarly, buildings are often missing or inaccurately indicated on maps.

Many efforts to align maps and images have required significant manual effort. For example, humans or machines may locate points of interest in the imagery and map (e.g., the center of an intersection) to align the map and images. However, this is tedious and prone to inaccuracies, and does not account for map data that is simply incorrect (e.g., showing a road at an incorrect location). In some aspects, humans can manually trace roads, as depicted in imagery, in order to indicate the proper location of the roads for the map. This is also prone to inaccuracies due to human error, and requires massive manual effort.

Embodiments of the present disclosure provide techniques to process images and maps using a system of machine learning (ML) models, such as neural networks, in order to improve the resulting images and/or maps. For example, in one embodiment, satellite or other aerial imagery is processed using one or more trained models to automatically create a generated map that accurately indicates the positions, sizes, and orientations of relevant features, such as roads, highways, buildings, railroads, and the like. In some embodiments, images can be registered to existing maps using the models. As used herein, registering an image to a map includes aligning the image to the map, such that the elements reflected in the map data align with images of the elements in the imagery. This can include, for example, translating the image along one or more axes, distorting the image in locations, and the like.

In one embodiment, one or more cyclical generative adversarial networks (GAN) are used to process received images. The cyclical GAN can include two GANs, each of which include a generator model and a discriminator model. In an embodiment, the first GAN is trained to receive imagery and generate a corresponding map. The discriminator of the first GAN is then trained to classify input as either a generated map (e.g., created by the GAN's generator) or an actual map. In this way, the discriminator and generator can be used to iteratively refine each other, without the need for separate labeled training data. In some embodiments, a second GAN is trained to receive map data and generate corresponding imagery. The discriminator of the second GAN similarly learns to categorize input as either a true image or a generated image, allowing the second GAN to learn.

In an embodiment, the system is cyclical because the output from each GAN can be used as input to the other. For example, an image can be used to generate an artificial map, which can then be used to generate an artificial image. This generated image can then be compared to the original input image, and the differences between them (e.g., the loss) can be used to refine both models. Similarly, a map can be used to generate an artificial image, which can then be used to generate an artificial map. This generated map can then be compared to the original input map, and the differences between them (e.g., the loss) can be used to refine the models. In some embodiments, after training is completed, the map generator can be used to process actual images in order to generate highly accurate and precise maps reflecting the features of the image.

In some embodiments, all or a portion of the GAN can also be used to register images to maps. For example, the first GAN can be used to generate a map given an input image. In one such embodiment, the second GAN is modified to receive this artificial map, as well as an actual map for the area. In an embodiment, the second GAN then generates a resulting image that reflects the original image received, but potentially with distortions or other changes, such that the image is aligned with the actual map.

Figure 1A:
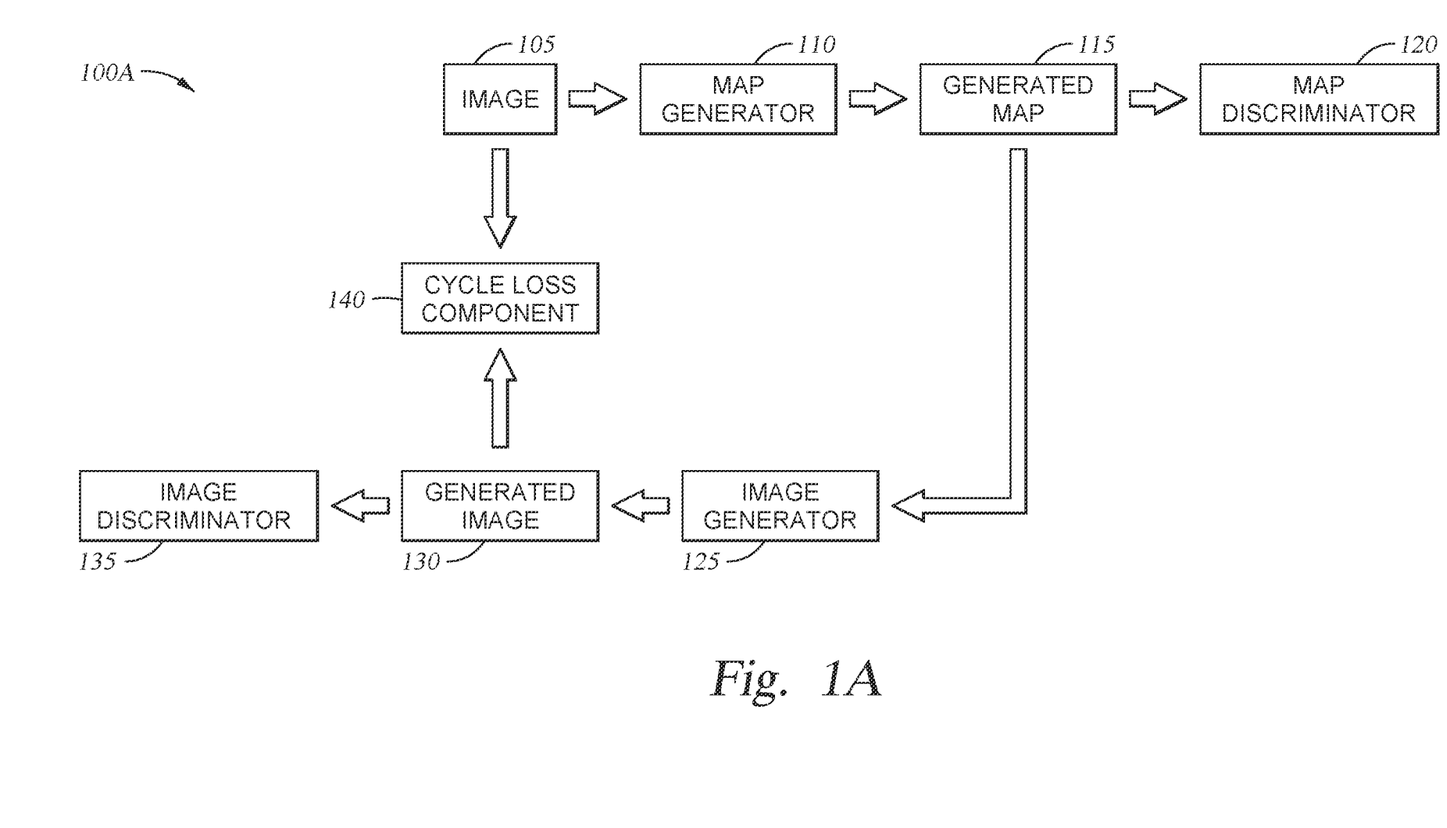
FIGS. 1A and 1B depict a workflow for training cyclical generative adversarial networks (GANs) for processing images and maps, according to one embodiment disclosed herein.

FIG. 1A depicts a workflow 100A for training cyclical generative adversarial networks (GANs) for processing images and maps, according to one embodiment disclosed herein. Specifically, the workflow 100A depicts an iterative process of training the cyclical GAN using input images. Notably, in embodiments, the models do not require labeled training data. That is, the system need not receive pairs of images and corresponding maps. Instead, the system is trained using a set of images and a set of maps that may be entirely unrelated (e.g., depicting different locations). Each model can then be trained to generate output reflecting the style of the other data (e.g., the map generator processes received images to generate output that resembles a map, and the image generator processes received maps to generate output resembling an image).

In the illustrated embodiment, the workflow 100A begins when an Image 105 is provided to a Map Generator 110. The Image 105 can generally be any suitable image, including a satellite image, an image captured using an aerial platform, and the like. The Image 105 is generally representative of an elevated and/or isometric projection of a region or area captured either directly overhead or at an angle. In an embodiment, the Map Generator 110 is a neural network (e.g., as part of a GAN) trained to receive input images and generate corresponding map data. For example, in one embodiment, the Map Generator 110 receives a multi-dimensional array with at least two dimensions as input (e.g., an array of pixel data). Another dimension might represent, in some embodiments, spectral bands of the camera used to acquire the imagery. In some embodiments, the Map Generator 110 comprises one or more down sampling blocks, one or more residual network blocks, and one or more upsampling blocks. In one such embodiment, the down sampling block(s) can consist of convolutional layer(s), activation layer(s), and/or pooling layer(s). Further, the residual block(s) can consists of skip connection(s), and the upsampling block(s) can consist of transposed convolution layer(s), activation layer(s), and/or pooling layer(s).

As illustrated, the Map Generator 110 creates a Generated Map 115 attempting to reflect the style of an actual map. This Generated Map 115 is then provided to a Map Discriminator 120, which attempts to classify the input as either an actual map or an artificial map created by the Map Generator 110. In one embodiment, the Map Discriminator 120 learns to do so by training using a set of actual maps. In an embodiment, the result of the Map Discriminator 120 can be used to refine the Map Generator 110. For example, if the Map Discriminator 120 determines that the Generated Map 115 is not real, the parameters of the Map Generator 110 are tweaked or modified. In contrast, if the Map Generator 110 believes the Generated Map 115 is real, the parameters of the Map Discriminator 120 can be tweaked to improve its predictions. In some embodiments, the Map Discriminator 120 is a type of network configured to receive a multi-dimensional array with at least two dimensions as input (e.g., an array of pixel data), where the network comprises one or more blocks of convolution layer(s), activation layer(s), and/or pooling layer(s).

As illustrated, the Generated Map 115 is also provided to an Image Generator 125. Similarly to the Map Generator 110, the Image Generator 125 is generally a neural network trained to receive input map data and generate corresponding images. For example, in one embodiment, the Image Generator 125 receives a multi-dimensional array with at least two dimensions as input (e.g., an array of pixel data). Another dimension might represent, in some embodiments, the red, green and blue channels of a colorized map. In some embodiments, the Image Generator 125 comprises one or more down sampling blocks, one or more residual network blocks, and one or more upsampling blocks. In one such embodiment, the down sampling block(s) can consist of convolutional layer(s), activation layer(s), and/or pooling layer(s). Further, the residual block(s) can consists of skip connection(s), and the upsampling block(s) can consist of transposed convolution layer(s), activation layer(s), and/or pooling layer(s).

The Image Generator 125 creates a Generated Image 130 based on the received input data. The Generated Image 130 is generally intended to reflect the content of the input map, with the style or appearance of an Image 105. Similarly to the above discussion, the Image Discriminator 135 operates in the same way as the Map Discriminator 120, and attempts to classify input as either an actual image or a generated image. The results of this analysis can be used to refine the Image Discriminator 135 and/or Image Generator 125.

In the illustrated embodiment, both the Image 105 and the Generated Image 130 are evaluated by a Cycle Loss Component 140, which computes a loss for the system and refines one or more of the models based on the loss. In one embodiment, the Cycle Loss Component 140 computes the pixel-level loss between the Image 105 and the Generated Image 130. For example, the Cycle Loss Component 140 can evaluate and compare corresponding pixels of the Image 105 and Generated Image 130 to identify differences, and compute an overall cycle loss based on these differences.

In one embodiment, the Cycle Loss Component 140 can similarly compute a feature-specific loss (also referred to as a feature-weighted loss) based on the comparison. The feature-specific loss corresponds to pixel-level loss between the images, with respect to specific areas or features of the images. In one embodiment the system generates feature masks by evaluating the actual maps and/or the Generated Maps 115. For example, in some embodiments, meaningful features are associated with particular colors in the maps (e.g., yellow for roads, red for highways, blue for buildings, and the like) while other uninteresting features (e.g., fields, forests, water, or other background features) are associated with other colors. In one such embodiment, the system can use color similarity to identify and extract the meaningful features. A feature mask can then be generated indicating which regions of the image (e.g., which pixels) have notable features, and which pixels do not. In an embodiment, the feature-weighted loss can allocate additional weight to such feature regions, and/or reduce the weight of non-feature regions.

Figure 1B:
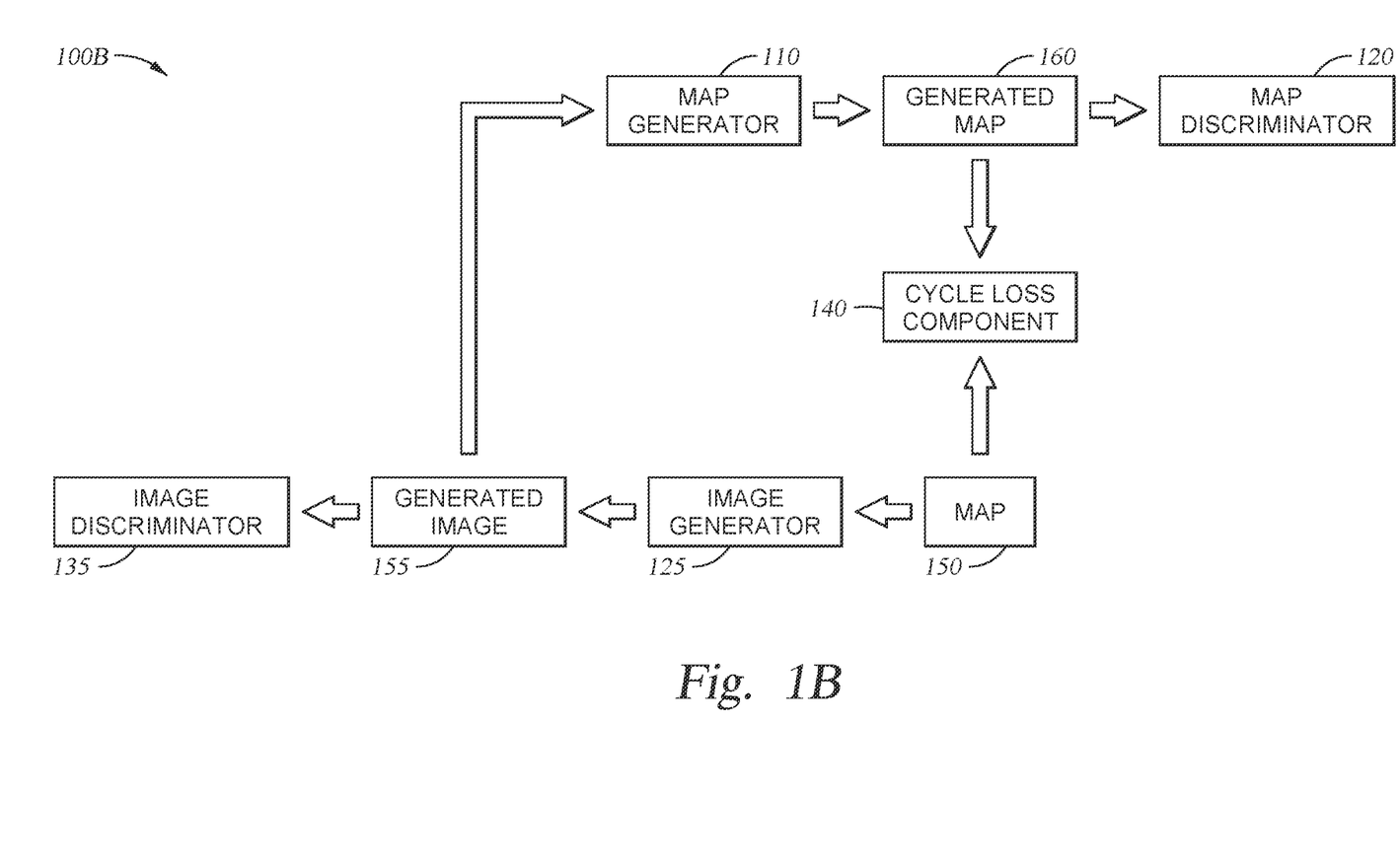

Typically, input Maps 150 have defined colors and/or patterns for each feature without variance (e.g., buildings have a first color, and roads have a second). In contrast, Generated Maps 160 created by cyclic GAN architectures often possess variance in feature color value (e.g., where buildings are generated with somewhat varied colors). In some embodiments, therefore, the concept of color similarity is utilized to allow for some color tolerance. In at least one embodiment, a histogram of color values in color space is determined for the Generated Map 160, resulting in mean color values and associated variances. This data can then be compared and matched with the original zero-variance colors of the given input Map 150. For example, if there is a map feature in the input Map 150 that has pure red color value in RGB space (e.g., 1,0,0), the system can match this with all red colors (including off-red colors) from the Generated Map 160 having values (1-r,g,b) with positive numerical values r, g, and b having magnitude according to a fixed threshold and/or automatically computed from a histogram of color values of the Generated Map 160.

In one embodiment, the overall system utilizes a composite loss measure that includes the pixel-level cycle loss, the feature-weighted cycle loss, the Map Generator 110 and/or Image Generator 125 losses, and the Map Discriminator 120 and/or Image Discriminator 135 losses. This loss can be used to iteratively refine the overall system, and improve the functioning of each individual component. Once the system has been trained, in an embodiment, the Map Generator 110 can be used to generate accurate maps based on received imagery.

FIG. 1B depicts a workflow 100B for training cyclical generative adversarial networks (GANs) for processing images and maps, according to one embodiment disclosed herein. Specifically, the workflow 100B depicts an iterative process of training the cyclical GAN using input maps. As discussed above, in embodiments, the models do not require labeled training data. That is, the system need not receive pairs of images and corresponding maps. Instead, the system is trained using a set of images and a set of maps that may be entirely unrelated (e.g., depicting different locations). Each model can then be trained to generate output reflecting the style of the other data (e.g., the map generator processes received images to generate output that resembles a map, and the image generator processes received maps to generate output resembling an image).

In the illustrated embodiment, the workflow 100B begins when a Map 150 is provided to the Image Generator 125. The Map 150 can generally be any suitable map, including and include data related to the sizes, positions, and/or orientations of one or more elements. The Map 150 is generally representative of a diagrammatic representation of an area of land or sea showing relevant physical features, cities, roads, and the like.

As illustrated, the Image Generator 125 creates a Generated Image 155 attempting to reflect the style of an actual image. This Generated Image 155 is then provided to the Image Discriminator 135, discussed above. The result of the Image Discriminator 135 can be used to refine the Image Generator 125. The Generated Image 155 is also provided to the Map Generator 110, described above.

The Map Generator 110 creates a Generated Map 160 based on the received input data. The Generated Image 160 is generally intended to reflect the content of the input image, with the style or appearance of a Map 150. As discussed above, the Map Discriminator 120 attempts to classify input as either an actual map or a generated map. The results of this analysis can be used to refine the Map Discriminator 120 and/or Map Generator 110.

In the illustrated embodiment, both the original Map 150 and the Generated Map 160 are evaluated by the Cycle Loss Component 140, which computes a loss for the system and refines one or more of the models based on the loss. In some embodiments, similarly to the above discussion with respect to loss between images, the Cycle Loss Component 140 computes the pixel-level loss between the Map 150 and the Generated Map 160. For example, the Cycle Loss Component 140 can evaluate and compare corresponding pixels of the Map 150 and Generated Map 160 to identify differences, and compute an overall cycle loss based on these differences.

In one embodiment, the Cycle Loss Component 140 can similarly compute a feature-specific loss (also referred to as a feature-weighted loss) based on the comparison, as discussed above. In some embodiments, the system therefore utilizes a composite loss measure that includes the pixel-level cycle loss for images and/or maps, the feature-weighted cycle loss for images and/or maps, the Map Generator 110 and/or Image Generator 125 losses, and the Map Discriminator 120 and/or Image Discriminator 135 losses. This loss can be used to iteratively refine the overall system, and improve the functioning of each individual component. Once the system has been trained, in an embodiment, the Map Generator 110 can be used to generate accurate maps based on received imagery. Although depicted as discrete workflows for conceptual clarity, in embodiments, the workflows 100A and 100B may be performed substantially simultaneously or jointly.

Figure 2:
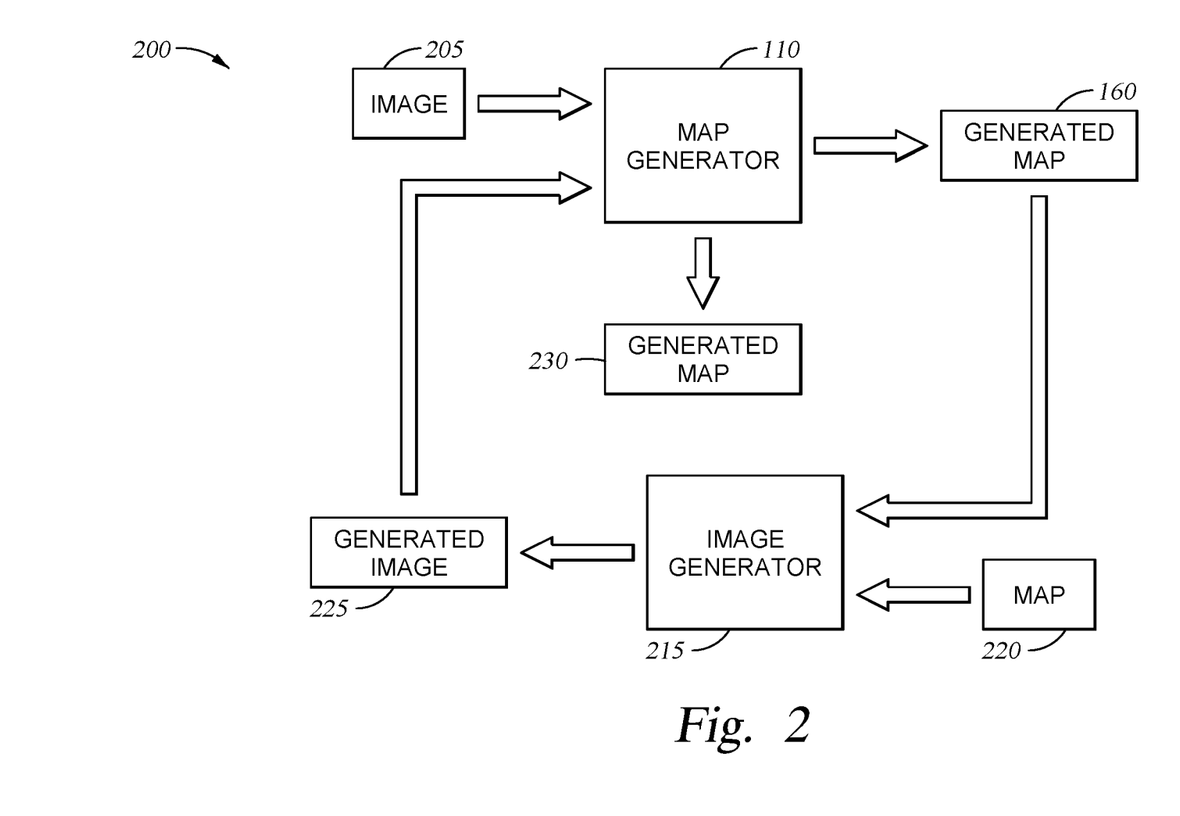
FIG. 2 depicts a workflow for training cyclical GANs to register images to maps, according to one embodiment disclosed herein.

FIG. 2 depicts a workflow 200 for training cyclical GANs to register images to maps, according to one embodiment disclosed herein. In an embodiment, the workflow 200 begins similarly to the workflow 100A described above. As discussed below in more detail, however, the cyclical GAN has been modified to register images to maps, rather than simply to generate images and/or maps. In one embodiment, this includes adding an extra half cycle during the training phase. As illustrated, the workflow 200 begins when an Image 205 is provided to the Map Generator 110. The Image 205 is generally reflective of an aerial and/or satellite image, as discussed above. The Map Generator 110 is a ML model trained to receive input images and generate a corresponding map, as discussed above.

As depicted in the workflow 200, given an original Image 205, the Map Generator 110 creates a Generated Map 210, which is provided to the Image Generator 215, as discussed above. In the illustrated embodiment, however, the Image Generator 215 is also configured to receive an actual Map 220, in addition to the Generated Map 210. In one embodiment, the Map 220 corresponds to the area depicted in the Image 205. For example, the Image 205 and Map 220 may both depict a downtown region of a city. The Image Generator 215 is a modified GAN generator, and is configured to generate a Registered Image 225. That is, rather than generating an image to match the input map (e.g., the Generated Map 210), the Image Generator 215 is configured to generate an output that includes the content of the Generated Map 210, aligned to the structure of the Map 220 by means of incorporating one or more additional loss terms in the optimization process as detailed below.

In embodiments, the resulting Registered Image 225 may be aligned differently, and/or distorted or otherwise biased in some areas, as compared to the original Image 205. That is, the Registered Image 225 is generally intended to depict the Image 205, but with zero or more modifications so as to more closely align the image elements with the locations, orientations, and/or sizes of the elements, as depicted in the Map 220. In embodiments, therefore, the system cannot simply compare the Registered Image 225 and the Image 205 to compute loss. That is, the Registered Image 225 and the Image 205 are generally not (and should not) be precise matches. Thus, computing a loss between them would result in poor results, as the system would learn to correct in the wrong direction.

In the illustrated embodiment, therefore, the workflow 200 includes an extra one half of a cycle in the cyclical training process. Specifically, the Registered Image 225 is provided as new input to the Map Generator 110. In response, the Map Generator 110 again creates a new map to reflect its input. In the illustrated workflow, this is the Generated Map 230. Although not included in the illustrated embodiment, in embodiments, this Generated Map 230 is then evaluated against the original (true) Map 220, in order to determine the cycle loss and/or feature-weighted loss. The resulting loss is then used to refine the models. In this way, the Image Generator 215 can be iteratively refined to produce Registered Images 220 that reflect the content of the input Image 205, while aligning to the structure of the input Map 220.

Thus, in the illustrated embodiment, training a system of models to register images to maps can include two distinct training phases. In the first, unpaired image and map data (e.g., with no particular labels or correspondence between them) are used to train one or more models (as discussed above with reference to FIGS. 1A and 1B). Next, a set of paired/labeled data (e.g., Images 205, each with a corresponding Map 220) are used to refine the model(s) to generate Registered Images 225.

In the illustrated workflow 200, discriminators (e.g., a Map Discriminator 120 and Image Discriminator 135) are omitted for visual clarity. In embodiments, however, the workflow 200 can similarly utilize such discriminators, as discussed above with reference to FIGS. 1A and 1B.

In some embodiments, image registration can be achieved by computing the optical flow that transforms the Generated Map 210 into the Map 220 without the extra half-cycle mentioned above. The extracted flow can then be directly applied to the pixels of the input Image 205 in order to generate the Registered Image 225. In this way, the pixels of the input Image 205 are transformed based on feature matching, given an accurate Map 220 and a Generated Map 210 created from input Image 205 by the Map Generator 110. In some embodiments, such a procedure can be stabilized against noise by generating the optical flow using feature map/masks discussed below with reference to FIG. 3, rather than directly using the Generated Map 210 and the Map 220. Note that such an approach goes beyond the more simplistic method of picking singular landmark points as geo-spatial references in an image for registration. In contrast to such simplistic methods, some embodiments described here treat every pixel of the map as a landmark, while potentially weighting its relevance using feature maps/masks discussed below.

Figure 3:
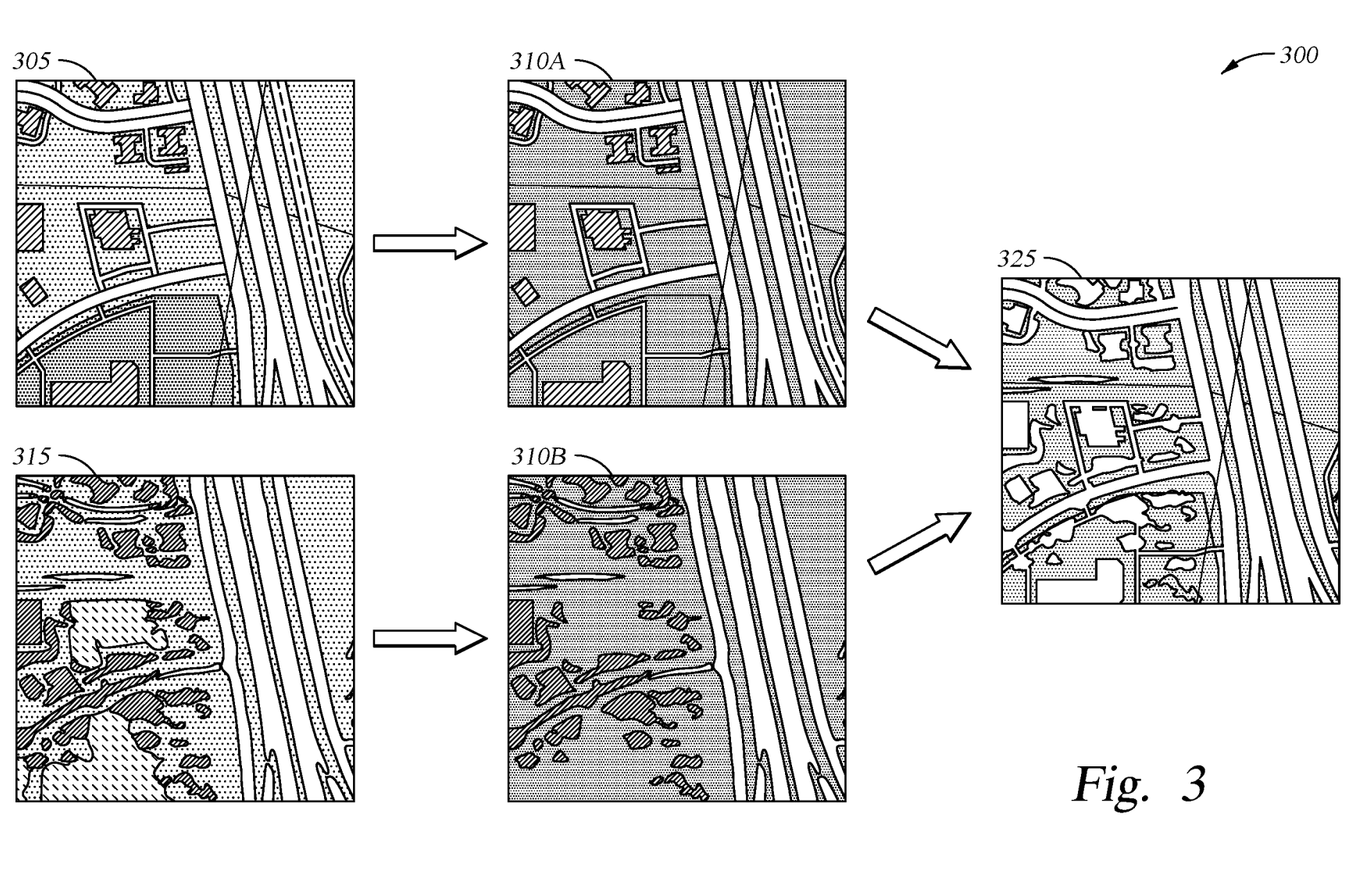
FIG. 3 depicts a workflow for processing data to generate feature masks to improve deep learning, according to one embodiment disclosed herein.

FIG. 3 depicts a workflow 300 for processing data to generate feature masks to improve deep learning, according to one embodiment disclosed herein. In the illustrated embodiment, a True Map 305 and a Generated Map 315 are evaluated to generate one or more Feature Masks 325. In some embodiments, True Maps 305 use different colors, patterns, and/or textures to indicate features or elements of the map. For example, highways and interstates may be a first color or pattern, main roads may be a second, secondary and tertiary roads may be a third, and so on. Similarly, buildings may be a different color or pattern. In some embodiments, the map also includes colorations or patterns indicating the land use, such as green for areas covered with vegetation, blue for water, a different color for paved areas (e.g., parking lots), and the like. Further, in some embodiments, one or more colors/patterns are used for generic background.

In the illustrated embodiment, the system uses color similarity to extract desired features from the True Map 305, and replaces non-desired features with a generic or default color or pattern. Specifically, in the illustrated embodiment, roads and buildings are the desired features, while all other colors/patterns correspond to elements that are not the focus or desired feature to focus on. Thus, as depicted in the Mask 310A, the non-preferred elements are replaced or covered over with a different color or pattern, indicating that no desired features are present in these regions. In embodiments, the desired features (and therefore the colors/patterns that the system attempts to identify and extract) can be specified by a user.

In the illustrated embodiment, a Generated Map 315 can similarly be evaluated to extract relevant features (e.g., using color similarity) to generate a Mask 310B. That is, while the True Map 305 corresponds to an actual map (e.g., created by one or more users), the Generated Map 315 can correspond to a map generated by the system, based on an image. In this way, the system can generate Masks 310B based on Generated Maps 315, rather than solely based on actual True Maps 305. This allows the system to generate feature masks for particular images, even if no accurate maps of the region have yet been created.

In the illustrated workflow 200, the system can combine the Mask 310A and Mask 310B to create an overall Feature Mask 325 for the original image/region. In one embodiment, this is accomplished by evaluating each pixel in the Mask 310A and 310B to determine whether it corresponds to the predefined color indicating inattention or a non-feature. If so, the system can generate a Feature Mask 325 indicating that this area is not of interest (e.g., using a value of zero for the weight of the pixel). In contrast, if the pixel corresponds to one of the extracted features (e.g., based on its color or pattern), the system can replace it with a corresponding "feature" color or pattern, used to indicate to the models that this region is of particular interest or weight (e.g., using a weight of one for the pixel). That is, all features can be replaced with a single color or value indicating interest, regardless of the type of feature.

In the illustrated embodiment, the Feature Mask 325 is the union of the individual Masks 310A and 310B. In some embodiments, if only a True Map 305 is available, the Feature Mask 325 is generated based solely on this map. Similarly, if only a Generated Map 315 is available, the Feature Mask 325 can be generated based solely on the generated map. In an embodiment, as discussed above, the Feature Mask 325 can be used when computing the loss between the final generated image or map and the original image or map. The Feature Mask 325 instructs the system to pay extra attention to the regions of the image that include features (e.g., by applying additional weight to these regions) when computing the overall loss and refining the models.

Figure 4:
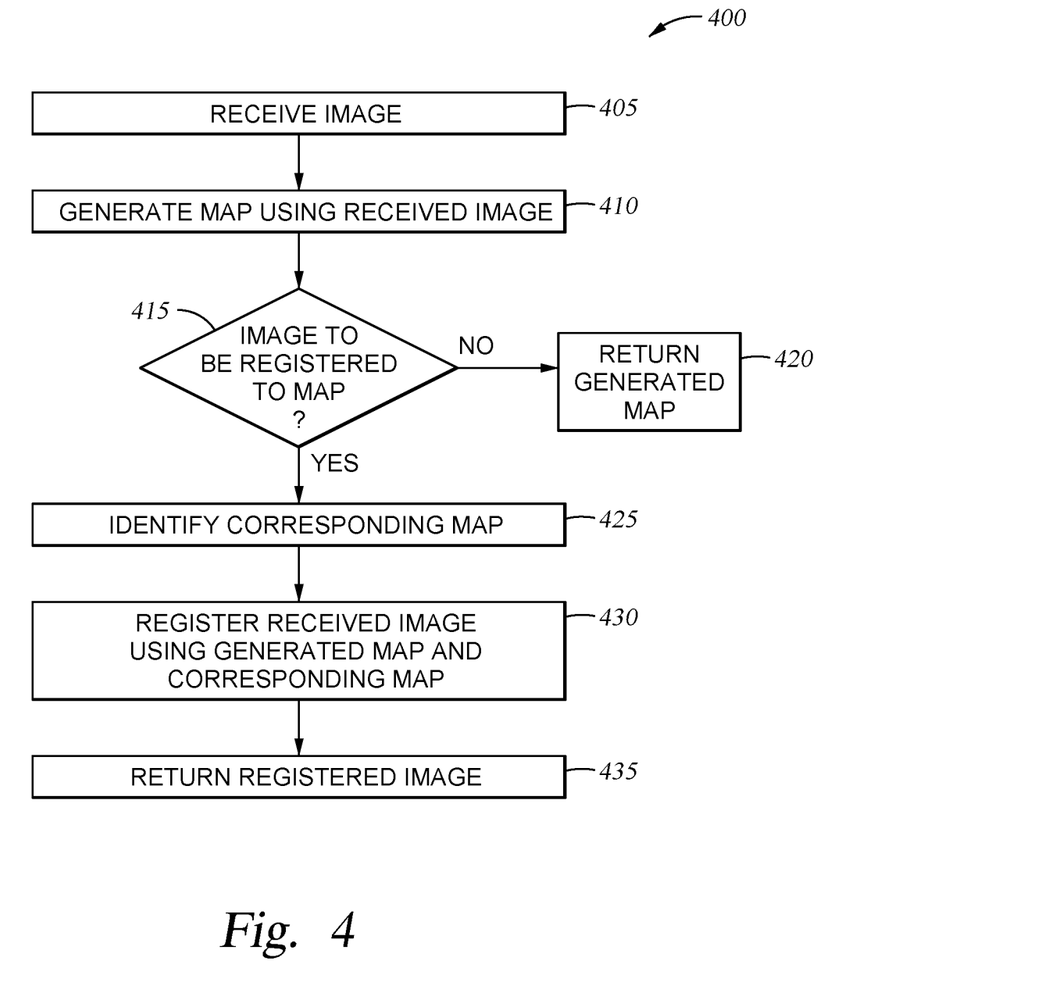
FIG. 4 is a flow diagram illustrating a method for processing received images using one or more trained machine learning models, according to one embodiment disclosed herein.

FIG. 4 is a flow diagram illustrating a method 400 for processing received images using one or more trained machine learning models, according to one embodiment disclosed herein. The method 400 is generally performed after the model(s) have been trained. The method 400 begins at block 405, where the system receives an image. As discussed above, in embodiments, this image can include aerial imagery, satellite imagery, and the like. The method 400 then proceeds to block 410, where the system generates a map using the received image. In one embodiment, this includes providing the image as input to an ML model (e.g., a neural network) that has been trained to generate output reflecting the style of a map (e.g., with various colors representing various features) based on the content of an image. For example, the system may provide the image as input to a Map Generator 110.

The method 400 then proceeds to block 415, where the system determines whether the image is to be registered to a map. That is, the system determines whether the image was provided for the purpose of generating a new map, or for the purpose of registering/aligning the image to an existing map. In some embodiments, the desired output is specified by a user when providing the image, and/or inferred based on whether a corresponding map was also provided along with the image. If the image is being used to generate a new map, the method 400 continues to block 420. At block 420, the system returns the generated map.

In embodiments, as discussed above, the generated map is a spatially-accurate that depicts the positions, orientations, and/or sizes of selected features (e.g., roads and buildings) identified in the input image. In this way, the map can be used to accurately indicate the relative positions and arrangements of these features. In many embodiments, this generated map is more accurate than those created by human users, and is less prone to errors or mistakes. Further, the generated map is created automatically without human input, which significantly improves the functionality.

In one embodiment, the system returns the map to the requesting entity. In some embodiments, the system can perform additional processing with the map. For example, in one embodiment, the system can stitch two or more generated maps together to create a larger map. Similarly, in some embodiments, the generated maps can be used to compare a location over time, such as to identify changes in the region (e.g., new roads and/or buildings). In one such embodiment, the system can identify other generated map(s) that correspond to the same region, generated at a different time (or created using an image captured at a different time). The system can then return all such maps to the user. In at least one embodiment, the system can identify and indicate temporal differences and changes between the maps.

Returning to block 415, if the system determines that the image was provided to be registered to an existing map, the method 400 continues to block 425. At block 425, the system identifies one or more corresponding maps for the received image. In one embodiment, the image and a corresponding map of the area are both provided to the system. In another embodiment, the image determines the location of the image (e.g., specified in metadata), and retrieves map(s) that also depict the location. In still another embodiment, the system can identify corresponding map(s) by comparing the generated map to a repository of actual maps, and retrieve maps that are sufficiently matched to the generated map (e.g., above a threshold).

The method 400 then continues to block 430, where the system registers the received image with using the generated map and the corresponding map. In one embodiment, as discussed above, this includes providing the generated map (created in block 410) and the corresponding actual map (identified in block 425) to a trained Image Generator 215, described above. In an embodiment, the output of this block is an image reflecting the content of the original input image, but registered (e.g., aligned and/or distorted to match) the structure of the actual map. At block 435, the registered image is returned to the requesting entity.

Figure 5:
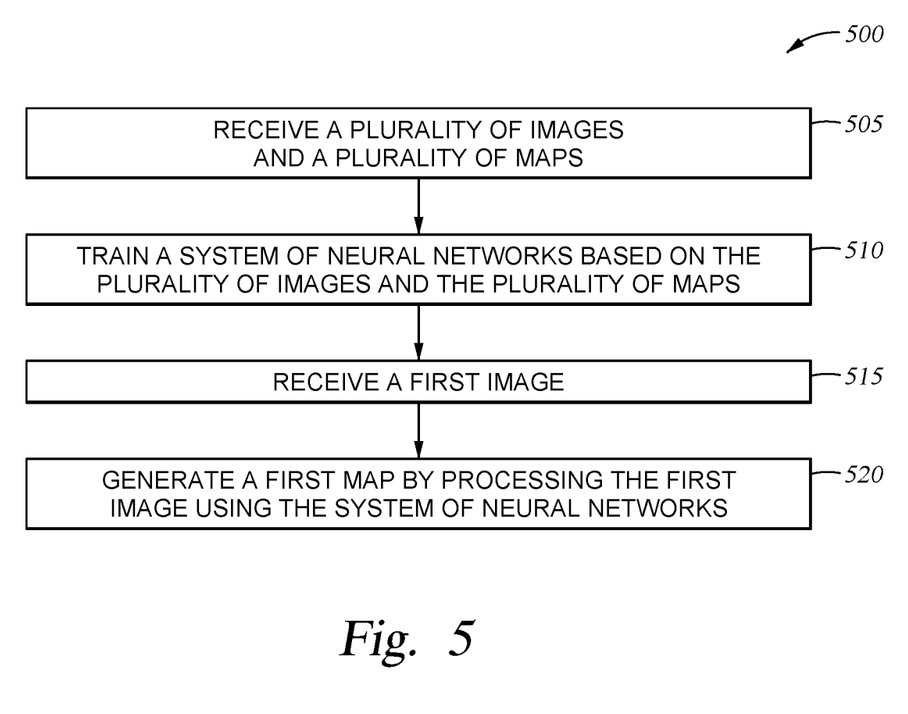
FIG. 5 is a flow diagram illustrating a method for processing images using one or more machine learning models, according to one embodiment disclosed herein.

FIG. 5 is a flow diagram illustrating a method 500 for processing images using one or more machine learning models, according to one embodiment disclosed herein. The method 500 begins at block 505, where an image transformation system receives a plurality of images and a plurality of maps. The method 500 then continues to block 510, where the image transformation system trains a system of neural networks based on the plurality of images and the plurality of maps. At block 515, the image transformation system receives a first image. The method 500 then proceeds to block 520, where the image transformation system generates a first map by processing the first image using the system of neural networks.

Figure 6:
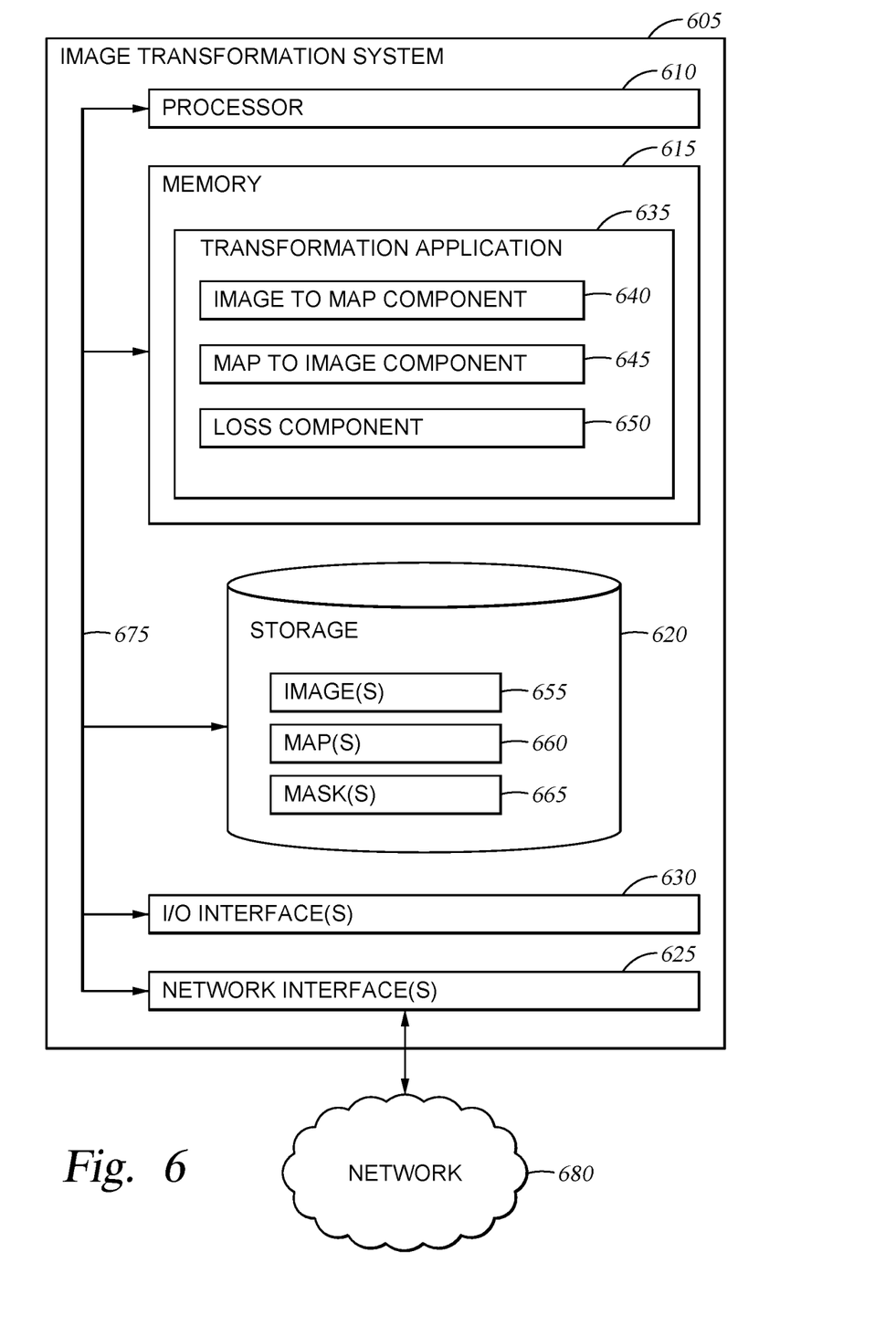
FIG. 6 is a block diagram depicting an image transformation system configured to process images and maps, according to one embodiment disclosed herein.

FIG. 6 is a block diagram depicting an Image Transformation System 605 configured to process images and maps, according to one embodiment disclosed herein. Although depicted as a physical device, in embodiments, the Image Transformation System 605 may implemented as a virtual device or service, and/or across a number of devices (e.g., in a cloud environment). As illustrated, the Image Transformation System 605 includes a Processor 610, Memory 615, Storage 620, a Network Interface 625, and one or more I/O Interfaces 630. In the illustrated embodiment, the Processor 610 retrieves and executes programming instructions stored in Memory 615, as well as stores and retrieves application data residing in Storage 620. The Processor 610 is generally representative of a single CPU and/or GPU, multiple CPUs and/or GPUs, a single CPU and/or GPU having multiple processing cores, and the like. The Memory 615 is generally included to be representative of a random access memory. Storage 620 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, input and output devices (such as keyboards, monitors, etc.) are connected via the I/O Interface(s) 630. Further, via the Network Interface 625, the Image Transformation System 605 can be communicatively coupled with one or more other devices and components (e.g., via the Network 680, which may include the Internet, local network(s), and the like). Additionally, the Network 680 may include wired connections, wireless connections, or a combination of wired and wireless connections. Further, as illustrated, the Processor 610, Memory 615, Storage 620, Network Interface(s) 625, and I/O Interface(s) 630 are communicatively coupled by one or more Buses 675.

In the illustrated embodiment, the Storage 620 includes a set of Images 655, Maps 660, and Masks 665. In one embodiment, the Images 655 include a set of satellite or aerial images, as discussed above. In some embodiments, the Images 655 also include generated images (e.g., created by the Image Transformation System 605 based on a map). Similarly, in embodiments, the Maps 660 include actual maps reflecting the style/coloration/pattern desired. In some embodiments, the Maps 660 also include generated maps (e.g., created based on a received Image 655). The Masks 665 generally include feature masks created based on one or more Maps 660. As discussed above, the Masks 665 indicate pixel regions of interest (e.g., that include relevant features), which allows the Image Transformation System 605 to effectively weight the loss computations, leading to more accurate model performance.

As illustrated, the Memory 615 includes a Transformation Application 635. Although depicted as software residing in memory, in embodiments, the functionality of the Transformation Application 635 can be implemented using hardware, software, or a combination of hardware and software. As illustrated, the Transformation Application 635 includes an Image to Map Component 640, a Map to Image Component 645, and a Loss Component 650. Although depicted as discrete components for conceptual clarity, in embodiments, the operations of the Image to Map Component 640, Map to Image Component 645, and Loss Component 650 can be combined or distributed across any number of components and devices.

In embodiments, the Image to Map Component 640 generally corresponds to one or more trained models configured to receive images (such as Image 655) and generate corresponding maps (such as Map 660). In one embodiment, as discussed above, the Image to Map Component 640 comprises a GAN including a generator network and a discriminator network. Similarly, the Map to Image Component 645 generally corresponds to one or more trained models configured to receive maps (such as Maps 660) and generate corresponding images (such as Images 655). In one embodiment, as discussed above, the Map to Image Component 645 comprises a GAN including a generator network and a discriminator network.

The Loss Component 650 is generally configured to compute the various losses in the system during training of the models. The models can then be refined based on the loss. In one embodiment, the loss can include one or more of the following components: (i) the loss between a generated map (created based on an image of a region) and an actual map of the region; (ii) the loss between a generated image (created based on a map of a region) and an actual image of the region; (iii) loss relating to output of the image discriminator (e.g., based on whether the discriminator accurately classified the image as artificial); (iv) loss relating to output of the map discriminator (e.g., based on whether the discriminator accurately classified the map as artificial); (v) the loss between the original input image and the ultimate output image, referred to as cycle loss (e.g., where the output image is generated by providing the input image to the Image to Map Component 640 to create an artificial map, then providing the artificial map to the Map to Image Component 645 to create an artificial image); (vi) the loss between the original input map and the ultimate output map, also referred to as cycle loss (e.g., where the output map is generated by providing the input map to the Map to Image Component 645 to create an artificial image, then providing the artificial image to the Image to Map Component 640 to create an artificial map); (vii) the feature-weighted loss between the input image and the generated image; (viii) the feature-weighted loss between the input map and the generated map; (ix) the loss between a map created based on a registered image, and an actual map (e.g., where the map created based on the registered image is generated using workflow 200); or (x) a feature-weighted loss between a map created based on a registered image, and the actual map.

In embodiments, the Loss Component 650 generally computes each loss component by performing a pixel-by-pixel analysis of the relevant images and/or maps discussed above. The Loss Component 650 can then refine one or more of the models based on the relevant loss components. This refinement can include, for example, modifying one or more internal weights or parameters of each model.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding and/or following, reference is made to embodiments presented in this disclosure. However, the scope of the present disclosure is not limited to specific described embodiments. Instead, any combination of the preceding and/or following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding and/or following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the Transformation Application 635) or related data available in the cloud. For example, the Transformation Application 635 could execute on a computing system in the cloud and process received images and/or maps. In such a case, the Transformation Application 635 could generate new maps and/or registered images, and store the ML models and generated maps and images at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
    receiving a plurality of images and a plurality of maps;
    training a system of neural networks based on the plurality of images and the plurality of maps, comprising:
        training a map generator to generate maps by processing input images; and
        training an image generator to generate images by processing input maps, wherein the map generator and image generator share a loss function comprising:
            a loss based on the plurality of images and a plurality of generated images generated by one or more of the system of neural networks, and
            a loss based on the plurality of maps and a plurality of generated maps generated by one or more of the system of neural networks;
    receiving a first image; and
    generating a first map by processing the first image using the system of neural networks, wherein the first map comprises a diagrammatic representation of a physical space.

2. The method of claim 1, the method further comprising:
    identifying a first real map corresponding to the first image; and
    registering the first image to the first real map by processing the first map and the first real map using one or more neural networks in the system of neural networks.

3. The method of claim 2, wherein registering the first image to the first real map comprises:
    computing an optical flow that transforms the generated first map to the first real map; and
    applying the optical flow to the first image.

4. The method of claim 1, wherein the system of neural networks comprises a generative adversarial network (GAN).

5. The method of claim 1, wherein training the system of neural networks comprises:
    providing a first training image to the map generator to generate a first generated map;
    providing the first generated map to the image generator to generate a first generated image;
    determining a loss by comparing the first training image and the first generated image; and
    refining the map generator and image generator based on the determined loss.

6. The method of claim 1, wherein training the system of neural networks comprises:
    providing a first training map to the image generator to generate a first generated image;
    providing the first generated image to the map generator to generate a first generated map;
    determining a loss by comparing the first training map and the first generated map; and
    refining the map generator and image generator based on the determined loss.

7. The method of claim 1, wherein the loss function further comprises:
    (i) pixel-level loss between the plurality of images and the plurality of generated images generated by one or more of the system of neural networks;
    (ii) pixel-level loss between the plurality of maps and the plurality of generated maps generated by one or more of the system of neural networks; and
    (iii) a feature-weighted loss corresponding to pixel-level loss for defined areas of the plurality of images and plurality of generated areas.

8. The method of claim 7, wherein the defined areas of the plurality of images and plurality of generated areas are selected by applying one or more color similarity metrics to the plurality of images and the plurality of generated images to identify features of interest.

9. A computer program product comprising one or more computer-readable storage media collectively containing computer-readable program code that, when executed by operation of one or more computer processors, performs an operation comprising:
    receiving a plurality of images and a plurality of maps;
    training a system of neural networks based on the plurality of images and the plurality of maps, comprising:
        training a map generator to generate maps by processing input images; and
        training an image generator to generate images by processing input maps, wherein the map generator and image generator share a loss function comprising:
            a loss based on the plurality of images and a plurality of generated images generated by one or more of the system of neural networks, and
            a loss based on the plurality of maps and a plurality of generated maps generated by one or more of the system of neural networks;
    receiving a first image; and
    generating a first map by processing the first image using the system of neural networks, wherein the first map comprises a diagrammatic representation of a physical space.

10. The computer program product of claim 9, the operation further comprising:
    identifying a first real map corresponding to the first image; and
    registering the first image to the first real map by processing the first map and the first real map using one or more neural networks in the system of neural networks.

11. The computer program product of claim 10, wherein training the system of neural networks comprises:
    providing a first training image to the map generator to generate a first generated map;
    providing the first generated map to the image generator to generate a first generated image;
    determining a loss by comparing the first training image and the first generated image; and
    refining the map generator and image generator based on the determined loss.

12. The computer program product of claim 10, wherein training the system of neural networks comprises:
   providing a first training map to the image generator to generate a first generated image;
   providing the first generated image to the map generator to generate a first generated map;
   determining a loss by comparing the first training map and the first generated map; and
   refining the map generator and image generator based on the determined loss.

13. The computer program product of claim 10, wherein the loss function further comprises:
   (i) pixel-level loss between the plurality of images and the plurality of generated images generated by one or more of the system of neural networks;
   (ii) pixel-level loss between the plurality of maps and the plurality of generated maps generated by one or more of the system of neural networks; and
   (iii) a feature-weighted loss corresponding to pixel-level loss for defined areas of the plurality of images and plurality of generated areas.

14. The computer program product of claim 9, wherein the system of neural networks comprises a generative adversarial network (GAN).

15. A system comprising:
   one or more computer processors; and
   one or more memories collectively containing one or more programs which when executed by the one or more computer processors performs an operation, the operation comprising:
      receiving a plurality of images and a plurality of maps;
      training a system of neural networks based on the plurality of images and the plurality of maps, comprising:
         training a map generator to generate maps by processing input images; and
         training an image generator to generate images by processing input maps, wherein the map generator and image generator share a loss function comprising:
            a loss based on the plurality of images and a plurality of generated images generated by one or more of the system of neural networks, and
            a loss based on the plurality of maps and a plurality of generated maps generated by one or more of the system of neural networks;
      receiving a first image; and
      generating a first map by processing the first image using the system of neural networks, wherein the first map comprises a diagrammatic representation of a physical space.

16. The system of claim 15, the operation further comprising:
   identifying a first real map corresponding to the first image; and
   registering the first image to the first real map by processing the first map and the first real map using one or more neural networks in the system of neural networks.

17. The system of claim 16, wherein training the system of neural networks comprises:
   providing a first training image to the map generator to generate a first generated map;
   providing the first generated map to the image generator to generate a first generated image;
   determining a loss by comparing the first training image and the first generated image; and
   refining the map generator and image generator based on the determined loss.

18. The system of claim 16, wherein training the system of neural networks comprises:
   providing a first training map to the image generator to generate a first generated image;
   providing the first generated image to the map generator to generate a first generated map;
   determining a loss by comparing the first training map and the first generated map; and
   refining the map generator and image generator based on the determined loss.

19. The system of claim 16, wherein the loss function further comprises:
   (i) pixel-level loss between the plurality of images and the plurality of generated images generated by one or more of the system of neural networks;
   (ii) pixel-level loss between the plurality of maps and the plurality of generated maps generated by one or more of the system of neural networks; and
   (iii) a feature-weighted loss corresponding to pixel-level loss for defined areas of the plurality of images and plurality of generated areas.

20. The system of claim 15, wherein the system of neural networks comprises a generative adversarial network (GAN).

* * * * *